(12) United States Patent
Shibukawa (10) Patent No.: US 6,515,210 B2
(45) Date of Patent: Feb. 4, 2003

(54) MUSICAL SCORE DISPLAYING APPARATUS AND METHOD

(75) Inventor: Takeo Shibukawa, Shizuoka-ken (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 10/068,203

(22) Filed: Feb. 6, 2002

(65) Prior Publication Data

US 2002/0134216 A1 Sep. 26, 2002

(30) Foreign Application Priority Data

Feb. 7, 2001 (JP) ........................................ 2001-030563

(51) Int. Cl.$^7$ ................................................. A63J 17/00
(52) U.S. Cl. ..................................... 84/477 A; 84/477 R
(58) Field of Search ........................... 84/464 A, 464 R, 84/470 R, 477 R (56) References Cited

U.S. PATENT DOCUMENTS 5,525,142 A * 6/1996 Yamauchi et al. ......... 84/477 R
5,656,789 A * 8/1997 Nakada et al. ............ 84/477 R
5,907,115 A * 5/1999 Matsunaga et al. ....... 84/464 A
6,137,042 A * 10/2000 Kurtzberg et al. ........ 84/477 R

FOREIGN PATENT DOCUMENTS

JP          29-8926         10/2000

* cited by examiner

*Primary Examiner*—Jeffrey Donels
(74) *Attorney, Agent, or Firm*—Rossi & Associates (57) ABSTRACT

This invention provides players with easy identification of notes in a musical score and correspondences between performance operators and notes in a musical score. An electronic musical instrument comprises a keyboard 11 having a plurality of keys, key-depression indicators 12 each of which corresponds to each key, and a color monitor 13. A microcomputer embedded in the electronic musical instrument reads out performance data stored in memory such as RAM in sequence as time goes on, and lights the key-depression indicators 12 to indicate keys to be depressed according to the performance data. The microcomputer also displays a musical score on the color monitor 13, using the performance data. Additionally, the microcomputer assigns a different color to each note name by using a note number in performance data, so that note colors used for the musical score display on the color monitor 13 and light colors lighted by the key-depression indicators 12 are controlled to correspond by note names.

12 Claims, 8 Drawing Sheets

MUSICAL SCORE DISPLAYING APPARATUS AND METHOD

BACKGROUND OF THE INVENTION

1. Field of the Invention

The present invention relates to a musical score displaying apparatus for displaying a musical score corresponding to music piece data constituted of a series of note data each of which represents a note and includes at least a note number representative of a note name, a musical score displaying method, a musical score displaying program for implementing the musical score displaying method on a computer, a performance assisting apparatus for assisting a performance using the music piece data, a performance assisting method and a performance assisting program for implementing the performance assisting method on a computer.

2. Description of the Prior Art

As Japanese Utility Model Publication No.29-8926 discloses, there exists a well-known apparatus for musical educational purposes which provides each key a plate with color-coding of note name as "Do" red, "Re" lemon and "Mi" green, enabling players to perform with the help of color-coded plates and a musical score whose notes are also color-coded in a like manner.

In recent years, on the other hand, a musical score displaying apparatus applied to an electronic musical instrument, a personal computers and so on, is capable of using music piece data constituted of a series of note data each of which represents a note, and displaying a musical score corresponding to the music piece data.

Although the former prior art is effective to help children and beginners identify a note with a key, it requires much expense in time and effort to prepare such color-coded musical scores for various music pieces. Also, it is impractical because the cost of manufacturing such musical scores is high.

In the latter prior art, since musical scores are displayed on a display device in monochrome (black and white), children and beginners have difficulty in finding the exact position of each note. Although it is possible to add information on color-coding of note to music piece data in order to display color-coded notes, each note data has to have color-coding information, which would increase the total volume of the music piece data and require specifically prepared music piece data. Therefore, the latter prior art is undesirable.

SUMMARY OF THE INVENTION

In view of the foregoing, an object of the present invention is to provide a musical score displaying apparatus, a musical score displaying method and a musical score displaying program for implementing the method on a computer, which make it easy for children and beginners to identify notes by displaying a musical score whose notes are color-coded by note names by using conventional music piece data, without requiring specifically prepared ones. Another object of the invention is to provide a performance assisting apparatus, a performance assisting method and a performance assisting program for implementing the method on a computer, which offer players higher effectiveness in practice by indicating to players performance operators such as keys to be depressed by lighting lamps which are color-coded in the same manner as the musical score display.

In order to achieve the above objects, according to a first aspect of the present invention, a musical score displaying apparatus for displaying a musical score corresponding to music piece data constituted of a series of note data each of which represents a note and includes at least a note number representative of a note name comprises a color monitor capable of displaying at least a musical score, and a musical score display controller for controlling the color monitor on the basis of the music piece data to display on the color monitor a musical score corresponding to the musical piece data, wherein a plurality of notes are displayed on the color monitor in a different color assigned to each note name based on note numbers included in the series of note data.

In the aspect of the present invention, the musical score display controller assigns note colors to be displayed on the color monitor. The color assignment is made by allocating a different color to each note name based on note numbers included in a series of note data. In this occasion, since each note number represents a note name, note colors to be displayed on a color monitor are easily varied by note names as far as a color monitor is provided. Because all the conventional music piece data include note numbers, the musical score display which offers players quick note identification is easily accomplished without requiring specifically prepared music piece data nor increasing the total amount of the music piece data.

Although the color assignment defined by the display controller can be fixed, it is also left customizable so that users can change color assignment. By customizing color assignment, users with partial colorblindness who have difficulty in perceiving certain colors are capable of using colors which they can easily distinguish.

According to a second aspect of the present invention, a performance assisting apparatus for assisting performance based on music piece data constituted of a series of note data each of which represents a note and includes at least a note number representative of a note name comprises a plurality of performance operators which are provided in corresponding relation to a plurality of note names and are used to trigger generation of a plurality of musical tones corresponding to the plurality of note names respectively by performance operation, a plurality of performance indicators which are provided in corresponding relation to the plurality of performance operators, for indicating a performance operator to be operated by lighting in a different color assigned to each note name, a performance indication controller for controlling the plurality of performance indicators on the basis of the music piece data, so that the plurality of performance indicators indicate a performance operator to be operated by lighting in a different color assigned to each note name, a color monitor capable of displaying at least a musical score, and a musical score display controller for controlling the color monitor on the basis of the musical piece data to display on the color monitor a musical score corresponding to the musical piece data, wherein a plurality of notes are displayed on the color monitor in a different color assigned to each note name based on note numbers included in the series of note data by adopting the same color assignment that is used by said plurality of performance indicators.

In the second aspect of the present invention, the performance indication controller controls the performance indicators based on musical piece data, and the performance indicators indicate the performance operators to be operated by lighting in a different color assigned to each note name. The musical score display controller controls the color monitor based on musical piece data, displays on the color monitor a musical score corresponding to the musical piece data, and assigns note colors to be displayed on the color monitor based on note numbers included in a series of note data by adopting the same color assignment that is used by the performance indicators. As a result, a light color emitted by a performance indicator for indicating a performance operator to be operated always coincides with a note color in a musical score displayed on the color monitor.

The second aspect of the present invention brings players who follow performance instruction enhanced effectiveness of practicing, allowing them to easily perceive notes in a musical score as well as positions of performance operators. Not only the first aspect of the present invention but also the second aspect can easily realize musical score display which offers players easy perception of notes, without requiring specifically prepared musical piece data, nor increasing the total amount of music piece data.

The second aspect of the present invention may be accomplished by providing the plurality of performance indicators with a plurality of various colors of monochromatic light-emitting devices, wherein a different color is assigned to each note name. On this occasion, the musical score display controller assigns note colors displayed on the color monitor in accordance with the light color assignment of light-emitting devices.

Another way to achieve the second aspect of the present invention is to provide the performance indicators each of which is comprised of a combination of a plurality of different colors of light-emitting elements (e.g. three light-emitting elements each of which emits a colored light of red, blue or green). On this occasion, the performance indication controller assigns a different color to each note name based on a note number when it controls the performance indicators in accordance with music piece data. The assignment defines luminance of each light-emitting element so that the performance indicators can emit various colors. When the musical score display controller assigns colors to note names to be displayed in a musical score on the color monitor, it employs the same color assignment which is employed by the performance indication controller.

As described above, when each of the performance indicators is comprised of a combination of a plurality of light-emitting elements with different colors, a color assignment applied to both light colors for the performance indicators and note colors for the musical score display may be fixed. The color assignment also may be left customizable, so that players with partial colorblindness who have difficulty in perceiving certain colors are capable of using colors which they can easily distinguish.

Further, according to a third aspect of the present invention, a musical score displaying method and a musical score displaying program are provided, while a performance assisting method and a performance assisting program are provided; the musical score displaying method is provided to accomplish the same capabilities as the musical score displaying apparatus; the musical score displaying program is provided to realize the method on a computer; the performance assisting method is provided to accomplish the same capabilities as the performance assisting apparatus; the performance assisting program is provided to realize the method on a computer. By these methods and programs, the same capabilities as described above are obtained, and the same effect as describe above is produced.

BRIEF DESCRIPTION OF THE DRAWINGS

In order to more fully understand the drawings used in the detailed description of the present invention, a brief description of each drawing is provided.

DESCRIPTION OF THE PREFERRED EMBODIMENT

Regarding a preferred embodiment for the present invention, an electronic musical instrument to which the musical score displaying apparatus and the performance assisting apparatus of the present invention are applied will be described with reference to the drawings.

Figure 1:
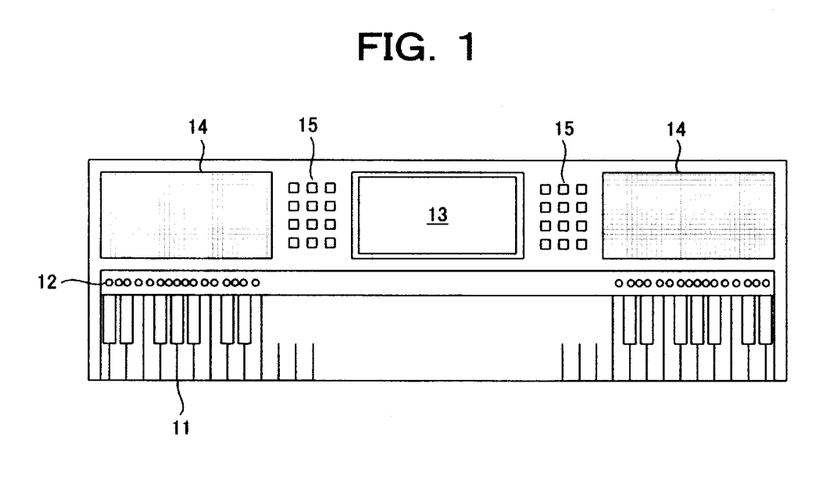
FIG. 1 is a front plan view of an electronic musical instrument applied to a preferred embodiment of the present invention.

As FIG. 1 shows a front plan view of the electronic musical instrument, the electronic musical instrument comprises a keyboard 11 horizontally placed at the front end of the electronic musical instrument. The keyboard 11 consists of a plurality of white keys and black keys served as performance operators which cover a plurality of octaves provided in corresponding relation to each note name such as C0, C0#, D0 . . . C1, C1#, D1 . . . etc. At the rear of the keyboard 11, a plurality of key-depression indicators 12 served as performance indicators are provided in a corresponding relation to the keys. As FIG. 2 describes in detail, each of the key-depression indicators 12 contains three light-emitting elements 12a; 12b, 12c, each of which emits red light, blue light and green light, respectively. Each key-depression indicator 12 is capable of emitting various colors by combining these light-emitting elements 12a, 12b, 12c in various luminance (or brightness). Each key-depression indicator 12 is able to emit at least 7 colors of red, yellow, green, orange, blue, purple, and white.

At the rear of the keyboard 11 and the key-depression indicators 12 is an operation panel. On the operation panel, a color monitor 13 is disposed at the center of the operation panel, and a pair of speakers 14, 14 is disposed adjacent each side of the color monitor 13. Between the color monitor 13 and each of the pair of the speakers 14, 14 is disposed a group of operational switches 15, 15. The color monitor 13 is formed of a color liquid crystal display device which is capable of displaying a musical score and various information in character and numeral. The speakers 14, 14 generate musical sound and voices. The group of operational switches 15 is formed of various switches. These switches are operated for specifying tone and loudness, etc., designating what to display on the color monitor 13, and instructing start and stop of automatic performance.

Figure 3:
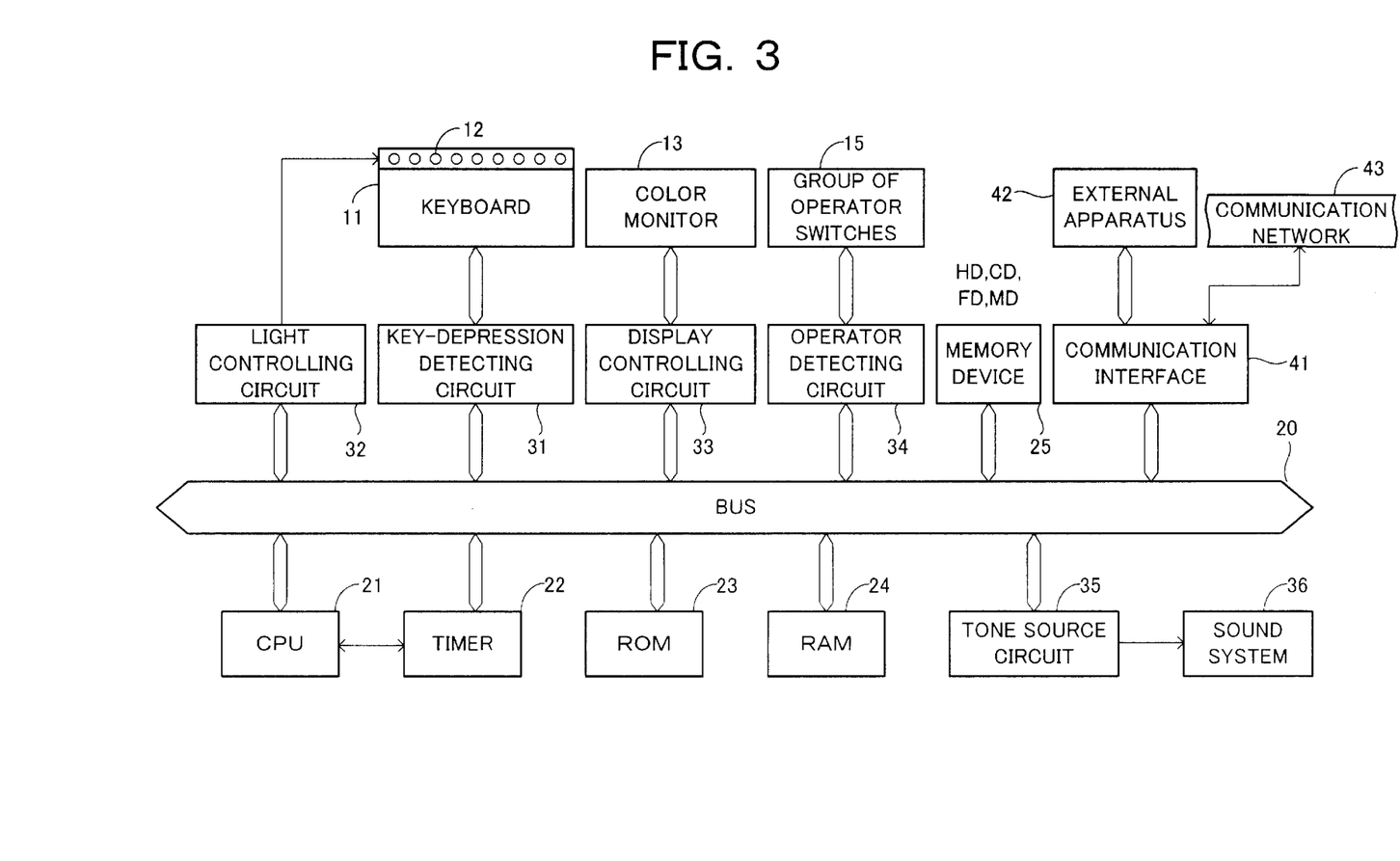
FIG. 3 is a block diagram illustrating an electric circuit configuration of the electronic musical instrument shown in FIG. 1.

Next, a circuit configuration of the electronic musical instrument will be described with reference to FIG. 3. The electronic musical instrument has a CPU 21, a timer 22, a ROM 23 and a RAM 24, each of which is connected to a bus 20 for configuring a main unit of a microcomputer. Further, a memory device 25 is connected to the bus 20 as a device to be attached to the main unit of the microcomputer. The memory device 25 includes a hard disc HD which is previously embedded in the electronic musical instrument, and various storage media such as a compact disc CD, a mini disc MD and a flexible disc FD which are attachable to the electronic musical instrument. The memory device 25 also includes drive units provided for each of the storage media. The memory device 25 enables the microcomputer to store and read volumes of data and programs.

In the present embodiment, the hard disc HD stores programs shown in FIG. 4 to FIG.7, a color table and music piece data which are used on the execution of the programs. These programs, the color table and the music piece data are supplied to the hard disc HD from the compact disc CD, the mini disc MD or the flexible disc FD. These programs, the color table and the music piece data also can be supplied via a communication interface 41 to the hard disc HD from an external apparatus 42 which will be described later. Further, these may be supplied from an external device such as a server via the communication network 43 and the communication interface 41.

Figure 8:
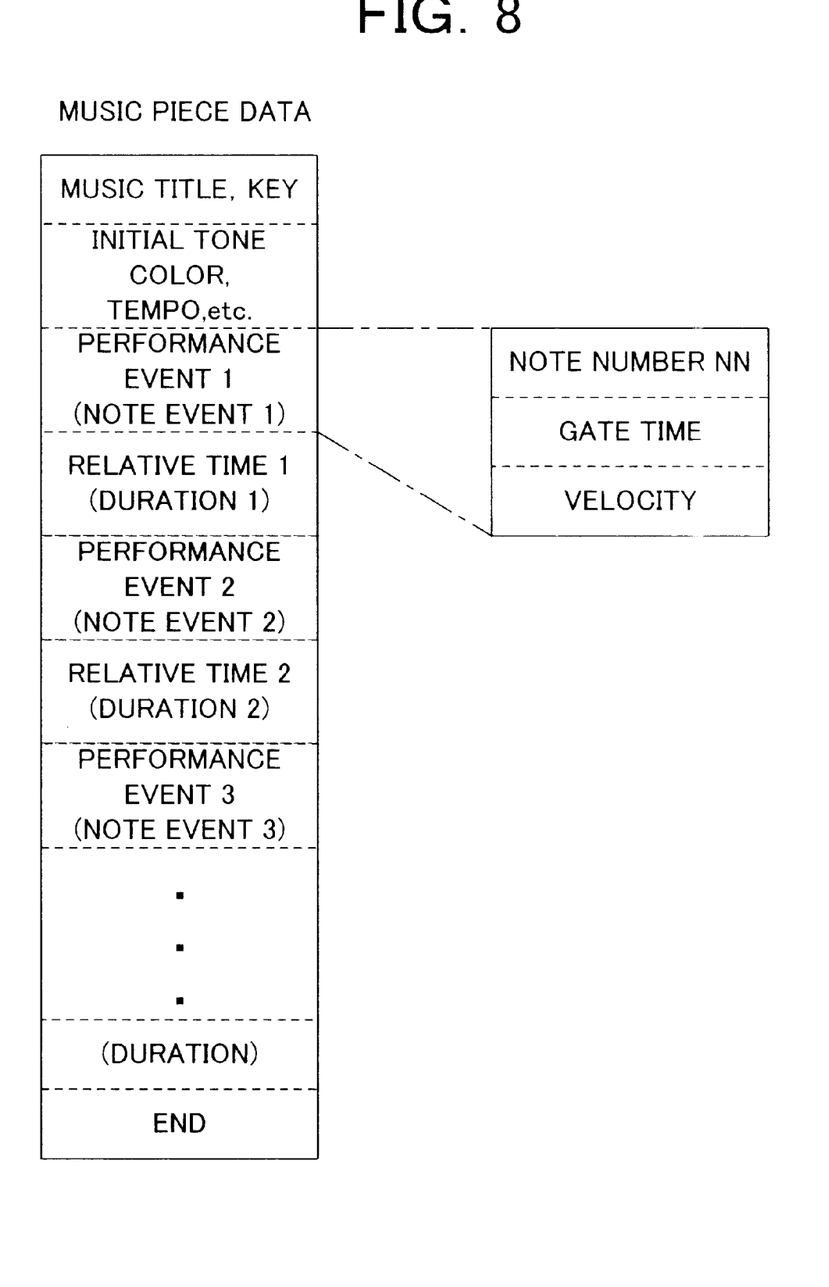
FIG. 8 is an illustration showing a format of music piece data.

The color table, which will be described in detail later, is provided for linking each note name of C to B with a different color. As shown in FIG. 8, the music piece data comprises music title and key data for representing a title of the music piece and a key of the music piece respectively, initial data for defining a tone color of musical sound to be initially generated and initial reproduction tempo of the music piece, performance data constituting pairs of performance event data for defining performance operation of the musical instrument in accordance with the progression of the music piece and relative time data for representing a time interval taken by each performance operation, and end data for indicating the end of the music piece. Although the performance event data includes not only note event data for representing musical sound to be performed but also tone color data for representing tone color of musical sound and tempo data for indicating change of reproduction tempo, only the note event data which directly relate to the present invention will be described in detail.

The note event data constitutes a note number NN representing a note name such as C0, C0#, D0 . . . C1, C1#, D1 . . . , a gate time representing a time for which a key for a tone is depressed, and a velocity representing loudness of a sound to be generated (key-depressing strength). The relative time data, which follows the note event data and is provided in a one-to-one relationship with the performance event data, represents a note length of a tone represented by the note number NN. Therefore, the relative time data is also referred to as duration data hereafter. The note event data and the duration data correspond to note data of present invention. Further, music piece data for a piece of music includes performance data for a right-hand part (melody part) and those for a left-hand part (accompaniment part).

Referring back to FIG. 3, the electronic musical instrument includes a key-depression detecting circuit 31, a light controlling circuit 32, a display controlling circuit 33, and a operator detecting circuit 34 which are connected to the bus 20. The key-depression detecting circuit 31 detects key-on/off of each key disposed on the keyboard 11, and outputs to the CPU 21 the key-on/off information representing the key-on/off of keys. The light controlling circuit 32 controls light-on/off and lighting color of the key-depression indicators 12 in accordance with information for indicating key-depression which is sent from the CPU 21. The display controlling circuit 33 controls display status conditions of the color monitor 13 in accordance with information sent from the CPU 21. The operator detecting circuit 34 detects operation of the group of operator switches 15, and outputs the operator information to the CPU 21.

A tone source circuit 35 and a communication interface 41 are also connected to the bus 20. The tone source circuit 35 produces musical tone signals on the basis of performance information (note number NN, key-on signal, key-off signal, gate time, velocity, tone color data, etc.) sent from the CPU 21, and outputs the musical tone signals to a sound system 36. The sound system 36, which includes not only the speaker 14, 14 but also an effect circuit, an amplifier, etc., adds musical effects to the musical tone signals sent from the tone source circuit 35, and generates musical tone in accordance with the musical tone signals. The communication interface 41, connectable to the external apparatus 42 such as other electronic musical instrument, personal computer, etc., enables this electronic musical instrument to transmit/receive various programs and data to/from the external apparatus 42. Further, the communication interface 41 is externally connectable through the communication network 43, which enables the electronic musical instrument to externally transmit/receive various programs and data.

Next, operation of the embodiment configured as described above will be explained. As the first operation, a user turns on a power on-off switch (not shown) of the electronic musical instrument, and operates the group of operator switches 15 so as to execute performance assistance operation. The first operation makes the CPU 21 execute a program not shown but stored in the ROM 23. By the execution of the program, the CPU 21 reads from the hard disc HD in the memory device 25 a performance assistance program shown in FIG. 4 (including subroutines of FIG. 5 to FIG. 7) and a color table used on execution of the program, stores them in the RAM 24, and starts the performance assistance program stored in the RAM 24. When the performance assistance program is not stored on the hard disc HD, the performance assistance program is read from the compact disc CD, mini disc MD, or flexible disc FD, etc. and stored on the hard disc HD. Alternatively, it is down loaded to the hard disc HD from an external device through the external apparatus 42 or the communication network 43. Subsequently, the performance assistance program is transferred to the RAM 24 and started up.

Figure 4:
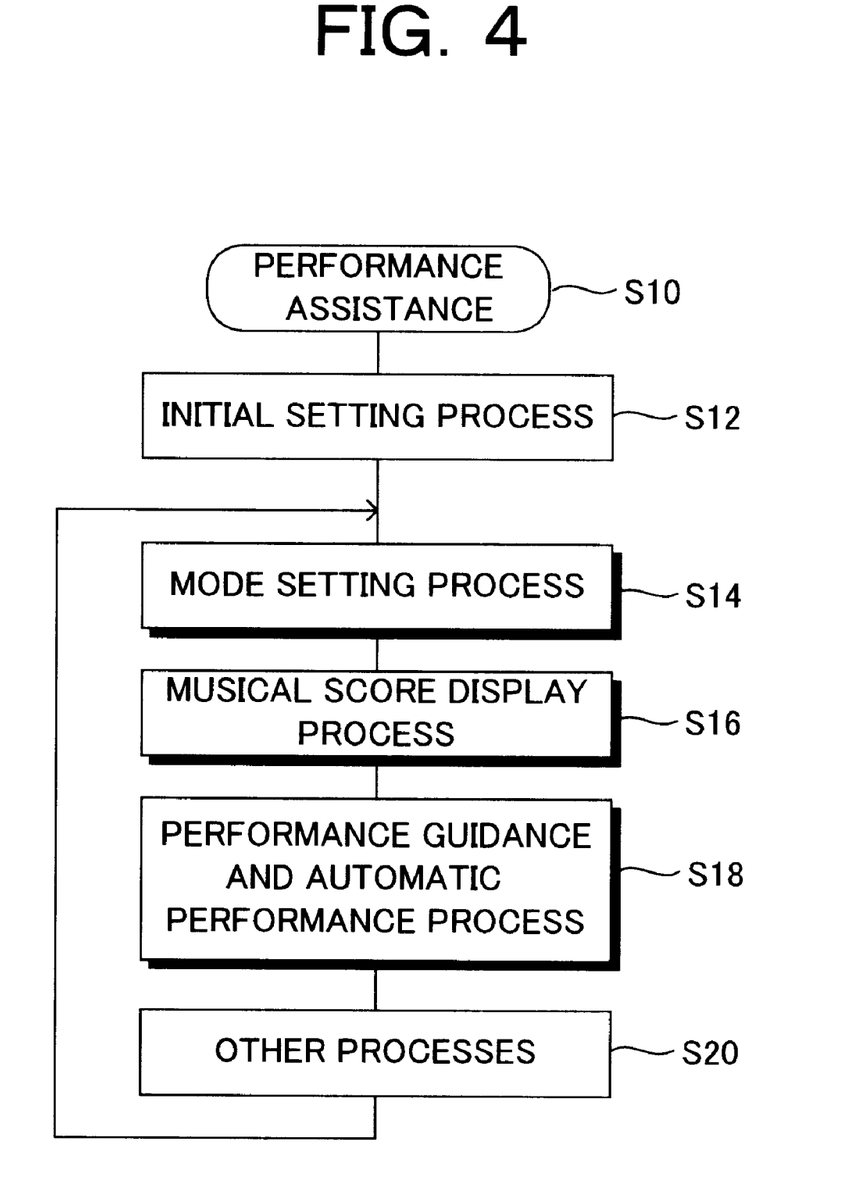
FIG. 4 is a flow chart of a performance assisting program executed by the CPU shown in FIG. 3.

As FIG. 4 shows, the performance assistance program is initiated at step S10, and proceeds to step S12 where an initial setting process is executed. At the initial setting process, initial settings for circuits connected to the bus 20 are made, while variables used on execution of the program are reset. After the initial setting process, a series of routines is repeatedly executed. The series of routines includes amode setting process routine at step S14, a musical score display process routine at step S16, performance guidance and automatic performance process routine at step S18, which will be described in detail later, and other processes at step S20. The processes at step S20 include a process for setting tone color and loudness of a musical tone to be generated by the performance of keyboard 11 in accordance with operations of the group of operator switches 15 and a process for instructing other operations done by the electronic musical instrument which are not related to the present invention.

Figure 5:
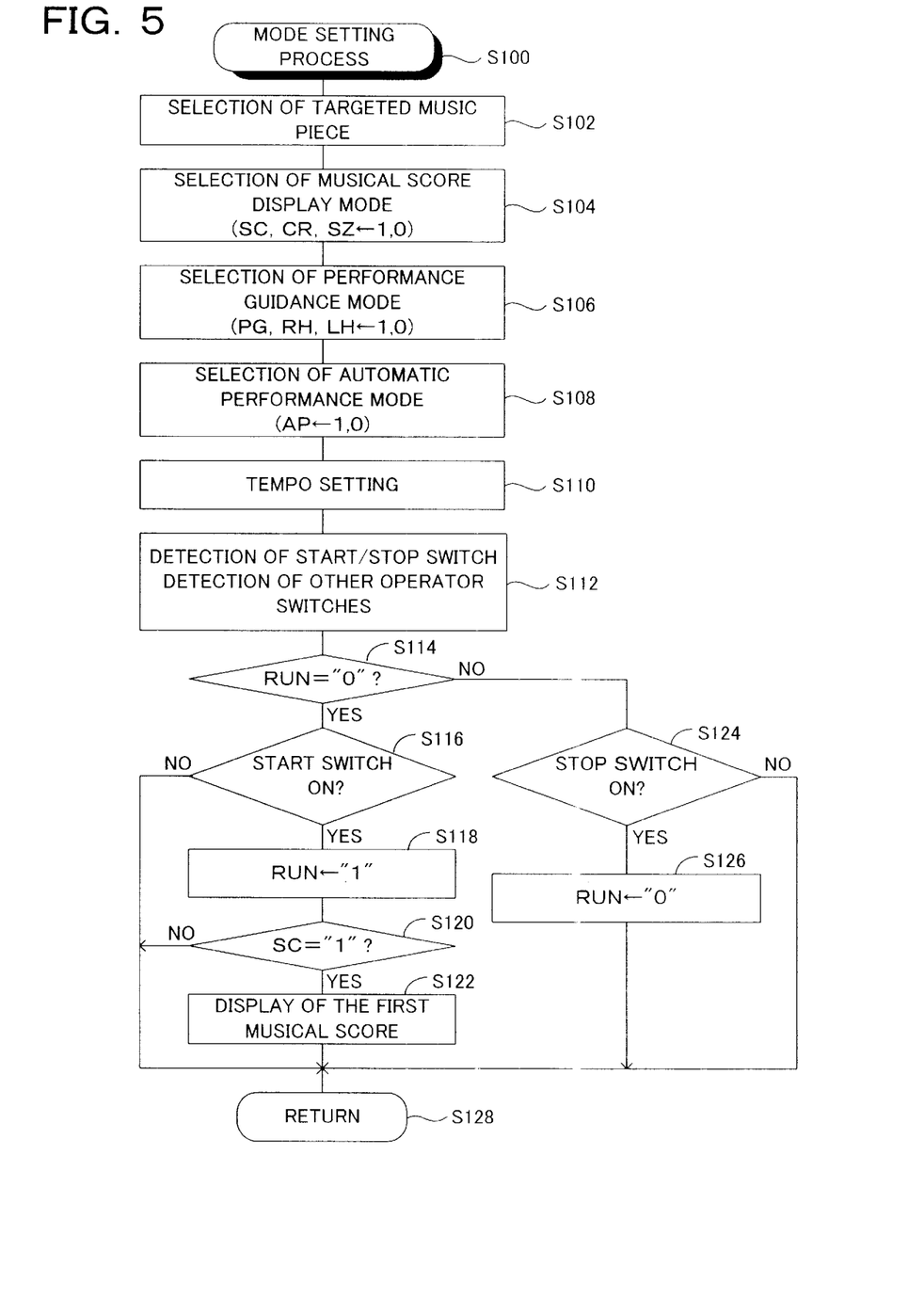
FIG. 5 is a detailed flow chart of the mode setting process routine shown in FIG. 4.

The mode setting process routine at step S14 is for setting various modes for performance assistance operations. As FIG. 5 shows, the mode setting process routine is initiated at step S100. After the step S100, the routine proceeds to step S102, where a targeted music piece is selected. Upon selection of a targeted music piece, the CPU 21 reads out all the music title data in a plurality of music piece data stored on the hard disc HD of the memory device 25, and a plurality of music titles stored as music title data are displayed on the color monitor 13. Among the displayed music titles, the user selects one title by operating the group of operator switches 15. After the selection, the music piece data of the selected title is transmitted to and stored in the RAM 24. When music piece data of a user-desired music piece is not stored on the hard disc HD, the desired music piece data can be read to the RAM 24 by either of the following schemes. In one scheme, the desired music piece data can be read from other storage media attachable to the electronic musical instrument such as the compact disc CD, the mini disc MD, and the flexible disc FD. In other scheme, the desired music piece data can be externally supplied to the RAM 24 through the communication network 43. In both schemes, however, it is recommended to write the music piece data written into the RAM 24 on the hard disc HD as well, so that the music piece data can be repeatedly used.

After the step S102, the routine proceeds to step S104 where flags for defining details on musical score display are set in accordance with operations of the group of operator switches 15 which are operated by the user in response to guidance displayed on the color monitor 13. The flags include a screen flag SC, a color flag CR, and a size flag SZ, which are set to either "1" or "0". When the screen flag SC is set to "1", it indicates that a musical score is to be displayed, while the screen flag SC set to "0" indicates that a musical score is not to be displayed. When the color flag CR is set to "1", it indicates that a musical score is to be displayed in color, while the color flag CR set to "0" indicates that a musical score is to be displayed in monochrome (black-and-white). When the size flag SZ is set to "1", it indicates that a displayed score is to be zoomed in (e.g., 2 lines of 2 bars per frame), while the size flag SZ set to "0" indicates that a displayed score is to be zoomed out (e.g., 4 lines of 4 bars per frame).

After the step S104, the routine proceeds to step S106 where flags for defining details on performance guidance (key-depression guidance) are set in accordance with operations of the group of operator switches 15 which are operated by the user in response to guidance displayed on the color monitor 13. The flags include a guidance flag PG, a right hand flag RH, and a left hand flag LH, which are set to either "1" or "0". When the guidance flag PG is set to "1", it indicates that a performance guidance is to be operated, while the guidance flag PG set to "0" indicates that a performance guidance is not to be operated. When the right hand flag RH is set to "1", it indicates a performance guidance for right hand part (melody part) is to be operated, while the right hand flag RH set to "0" indicates that a performance guidance for right hand part is not to be operated. When the left hand flag LH is set to "1", it indicates that a performance guidance for left handpart (accompaniment part) is to be operated, while the left hand flag LH set to "0" indicates that a performance guidance for left hand part is not to be operated.

After the step S106, the routine proceeds to step S108 where an automatic performance flag AP for defining automatic performance is set to either "1" or "0" in accordance with an operation of the group of operator switches 15 which is operated by the user in response to guidance displayed on the color monitor 13. When the automatic performance flag AP is set to "1", it indicates that an automatic performance is to be operated, while the automatic performance flag AP set to "0" indicates that an automatic performance is not to be operated. After the step S108, the routine proceeds to step S110 where a tempo for the automatic performance is set in accordance with the operation of the group of operator switches 15 which is operated by the user in response to guidance displayed on the color monitor 13. The routine further proceeds to step S112 where other operations of the group of operator switches 15 including a start switch and a stop switch for automatic performance are detected.

After the step S112, the routine proceeds to step S114. At step S114, it is determined whether a running state flag RUN is "0". If the running state flag RUN is set to "0", it indicates that the automatic performance is at a standstill, while the running state flag RUN set to "1" indicates that the automatic performance is under operation. If the running state flag RUN is at "0", "YES" is given to step S114, and the routine proceeds to step S116 where it is determined whether an ON operation of the start switch is detected in step S112. If step S112 has not detected an ON operation of the start switch, "NO" is given to step S116, and the mode setting routine ends in step S128.

If step S112 has detected an ON operation of the start switch, "YES" is given to step S116, and the routine proceeds to step S118 and sets the running state flag RUN to "1". After step S118, the routine moves on to step S120 where the value of the screen flag SC is checked. If the screen flag SC is set to "1", "YES" is given to step S120, and the routine proceeds to step S122 and executes a process for displaying the first screen of a musical score, and terminates at step S128. If the screen flag SC is set to "0", however, "NO" is given to step S120 , and terminates at step S128 without executing the process for musical score display at step S122.

Figure 9:
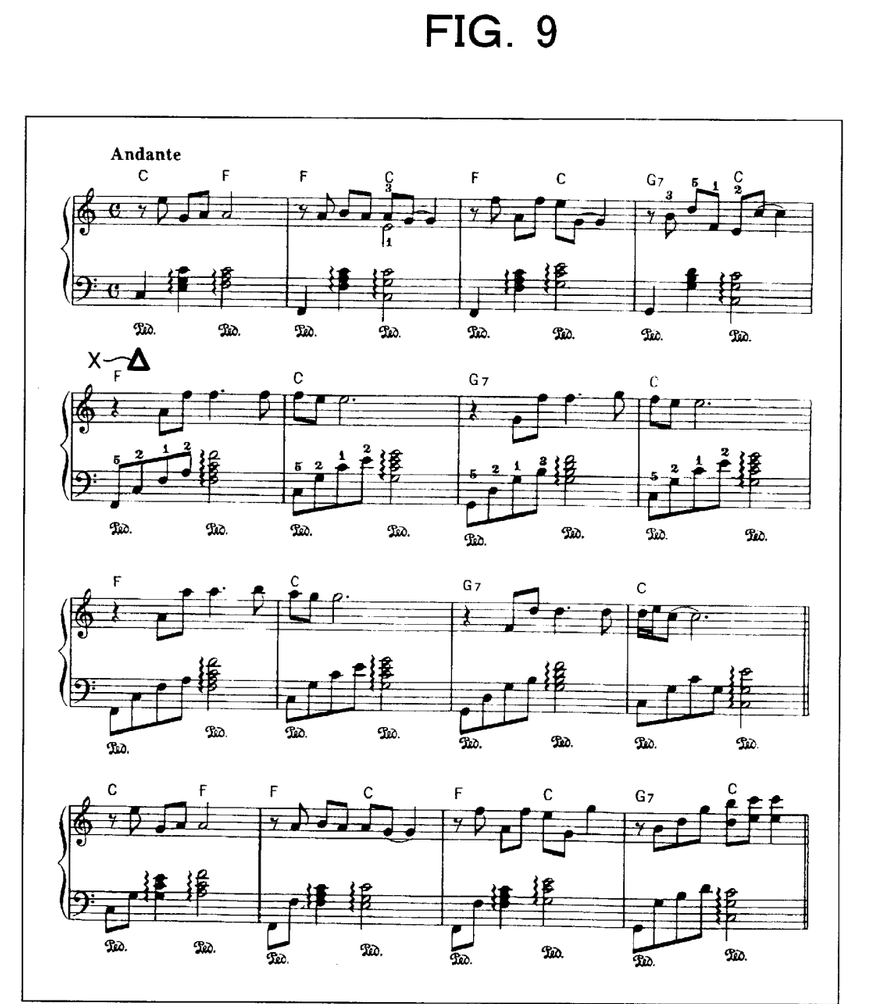
FIG. 9 is an example of a musical score displayed on the color monitor shown in FIG. 1.

At step S122 where a process for displaying the first screen of a musical score is executed, various data such as music title data, key data, reproduction tempo, etc. are read out from the RAM 24, while the first portion of the performance data is also read out. The amount of the portion to be read out corresponds to the size flag SZ which has been set at step S104. When the size flag SZ is set to "1", for example, the performance data of 2 lines of 2 bars (4 bars in total) will be displayed on the monitor as the first portion of the data. When the size flag SZ is set to "0", the performance data of 4 lines of 4 bars (16 bars in total) will be displayed. All the data read out from the RAM 24 is converted into image data as specified by the size flag SZ and the color flag CR, and the converted image data is outputted to the display controlling circuit 33. The display controlling circuit 33 controls the color monitor 13 in accordance with the image data and displays on the display 13 the first screen of the music score. (See FIG. 9) In this case which is explained above, when the size flag SZ is set to "1", the data read from the RAM 24 is converted into image data in such a manner that the musical score which is displayed on the color monitor 13 is zoomed in, that is to say, fewer notes are displayed in larger size (2 lines of 2 bars). When the size flag SZ is set to "0", on the other hand, the musical score displayed on the color monitor 13 is zoomed out, that is, more notes are displayed in smaller size (4 lines of 4 bars). When the color flag CR is set to "0", the data read from the RAM 24 is converted into image data in such a manner that the musical score is displayed on the color monitor 13 in monochrome (black and white). When the color flag CR is set to "1", on the other hand, color data is added to the image data which is to be displayed in monochrome, so that the musical score is displayed on the color monitor 13 in color. At the end of step S122, a cursor X is displayed on the starting point of the musical score.

To add color data to the image data for displaying the musical score in color, a color table transferred from the hard disc HD of the memory device 25 is used along with the program explained above. Based on the note number NN (note event) included in the performance data, color data for assigning a specific color to each note name is added to the image data which defines the position where a note is displayed.

A note number NN and the color table will be described with an example. An integer incremented by 1 from 0 (0, 1, 2, . . . 12, 13, 14 . . .) is assigned as a note number NN to each of note names rising from bass to treble (C0, C0#, D0 . . . C1, C1#, D1 . . . ). Remainders given after note numbers are divided by a positive integer k (k=12) are 0, 1, 2, . . . 11, each of which always corresponds to each of 12 tones of equal tempered scale (C, C#, D . . . B). That is, correspondences established between the remainders and the note names are repeated in different octaves. In accordance with the correspondences between the remainders and the note numbers, the color table assigns each of 7 colors of red, yellow, . . . white to each of 7 tones (C, D . . . B) either in major scale or in minor scale (see columns boxed in heavy line in TABLE 1 below). TABLE 1 shows 7 note names in major or minor scale and note numbers NN as well as the remainders and colors.

TABLE 1

| NOTE NAME | NOTE NUMBER NN | REMAINDER of NN/k | COLOR |
| --- | --- | --- | --- |
| C | 0, 12, 24, . . . | 0 | Red |
| D | 2, 14, 26, . . . | 2 | Yellow |
| E | 4, 16, 28, . . . | 4 | Green |
| F | 5, 17, 29, . . . | 5 | Orange |
| G | 7, 19, 31, . . . | 7 | Blue |
| A | 9, 21, 33, . . . | 9 | Purple |
| B | 11, 23, 35, . . . | 11 | White |

The color data to be added to the image data is derived by calculating a remainder given after a note number NN in performance data is divided by a positive integerk, and finding a corresponding color in the color table which represents correspondences between remainders and colors. The derived color data (corresponding to note name of each note) is added to the image data which describes position of each note. The image data with the color data is outputted to the display controlling circuit 33. As a result, in the musical score displayed on the color monitor 13, each note is displayed in color which corresponds to the note name (any of the 7 note names in major or minor scale).

In the description above, colors are assigned only to the 7 note names, namely, natural notes. Since targeted users of this performance assisting apparatus are children and beginners, musical pieces to be used for performance are simple, so that color assignment to natural tones will suffice in most times. However, when an accidental, which is one semitone either higher or lower than a natural tone, is used, the accidental is regarded as a tone one semitone higher than one of the 7 tones (natural notes). For example, a tone one semitone lower than "D" is regarded as "C#", while a tone one semitone higher than "D" is regarded as "D#". Each tone with "#" (e.g. C#, D# . . . A#) is assigned the same color that is allocated to a tone one semitone lower (e.g. C, D . . . A). On a displayed musical score, the note of the tone with "#" is displayed in the assigned color, with an accidental "#" added to the note.

On determination at the step S114, if "NO" is given, that is to say, the running state flag RUN is not at "0", the routine proceeds to step S124 and determines whether an ON operation of the stop switch has been detected at step S112. If not, then "NO" is given to step S124, and the routine proceeds to step S128 to terminate the mode setting process routine, whereas if an ON operation of the stop switch has been detected, "YES" is given to step S124, and the routine proceeds to step S126 to change the running state flag RUN to "0", and terminates the mode setting process routine.

Next, the musical score display process routine at step S16 shown in FIG. 4 will be explained. The musical score display process routine is for renewing a musical score display, keeping time with progression of readout of the musical piece data. The routine is initiated at step S200 in FIG. 6. After the routine is initiated, the routine proceeds to step S202 where it is determined whether the running state flag RUN has been set to "1". If the running state flag RUN has been set to "0", which means the automatic performance function is not under operation, "NO" is given to step S202, and the routine proceeds to step S216 to terminate the musical score display process routine.

Figure 6:
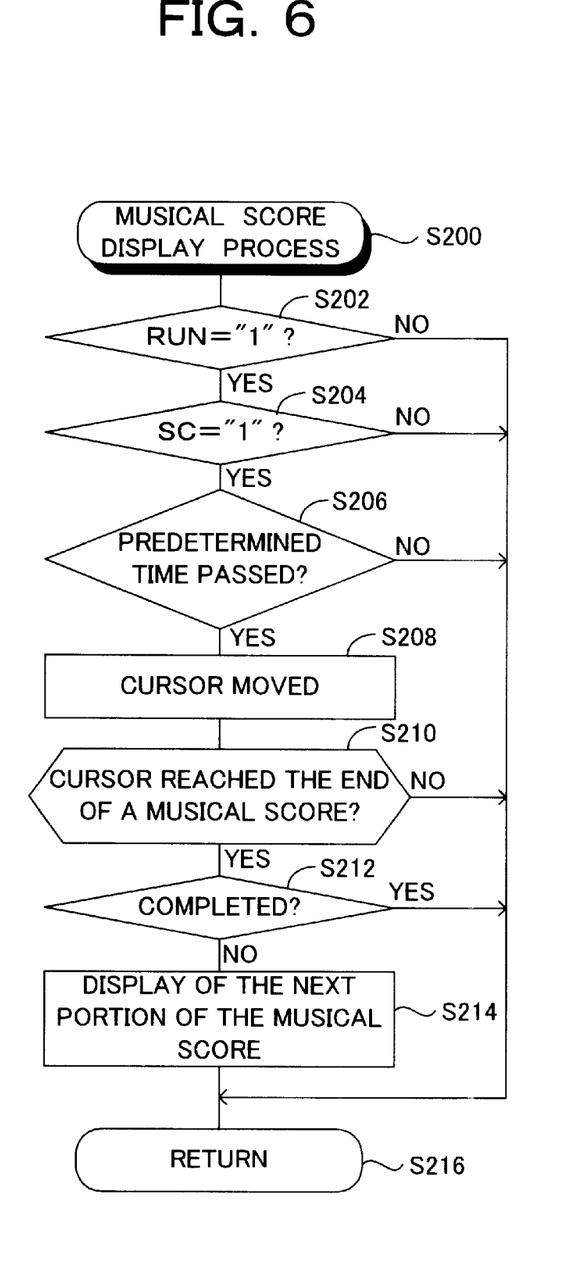
FIG. 6 is a detailed flow chart of the musical score display process routine shown in FIG. 4.

If the running state flag RUN is set to "1", on the other hand, "YES" is given to step S202, and the routine proceeds to step S204 where it is determined whether the screen flag SC has been set to "1". If the screen flag SC is at "0", "NO" is given to step S204, and the routine proceeds to step S216 and exits. If the screen flag SC is at "1", then "YES" is given to step S204, and the routine proceeds to step S206. In step S206, it is determined whether a predetermined time has passed since the previous musical score display process routine was executed. The determination in step S206 is made by using the timer 22. If the predetermined time has not passed, then "NO" is given to step S206, and the routine moves on to step S216 where it exits.

If the predetermined time has passed since the previous execution of the musical score display process routine, "YES" is given to step S206, and the routine proceeds to step S208, where the cursor X (See FIG. 9), which indicates in the musical score displayed on the color monitor 13 a point where the music is currently performed, is moved to a point which corresponds to the predetermined time. The tracking by the cursor X is realized by outputting in sequence to the display controlling circuit 33 image data of the cursor X at the moved position. Thus, the cursor X always traces the music in accordance with the time progression of the music.

After the step S208, the routine proceeds to step S210, where it is determined whether the cursor X has reached the end of the currently displayed musical score. In this step S210, it is determined whether the cursor X has reached the end of the displayed musical score. In other words, it is determined whether the note pointed by the cursor X corresponds to the last note of the performance data which is currently displayed. If the cursor X has not reached the end of the displayed musical score, "NO" is given to step S210, and the routine proceeds to step S216, where the musical score display process routine exits.

If the cursor X has reached the end of the displayed musical score, "YES" is given to step S210, and the routine proceeds to step S212, where it is determined whether the display of the whole musical score has been completed. Upon this determination, it is examined whether the last note in the currently displayed musical score corresponds to the last note in the performance data. If the display of the whole musical score has been completed, "YES" is given to step S212, and the routine proceeds to step S216, where the musical score display process routine exits.

If the display of the whole musical score has not been completed, "NO" is given to step S212, and the routine proceeds to step S214. After the process of S214 has been done, the routine goes on to step S216, where the musical score display process routine exits. In step S214, the predetermined amount of performance data to be subsequently displayed is read out from RAM 24. The read-out starts with the following note of the last one currently displayed. The amount of data to be read out is predetermined by the setting of the size flag SZ. For example, if the size flag SZ is at "1" performance data starting with the following note which accounts for 2 lines of 2 bars (4 bars in total) is read out. If the size flag SZ is at "0", performance data starting with the following note which accounts for 4 lines of 4 bars (16 bars in total) is read out.

The performance data read out from RAM 24 is converted to image data in accordance with the size flag SZ and the color flag CR in the same manner as the data converted at step S122 shown in FIG. 5. Then, the image data is outputted to the display controlling circuit 33. The display controlling circuit 33 replaces a piece of musical score currently displayed on the color monitor 13 with the next piece of the musical score. As far as the color flag CR is set to "1", notes on the new piece of the musical score are also displayed in color. A process employed here to assign a different color to each note name is the same one that is employed at step S122 in FIG. 5. At the end of the step S214, the cursor X is moved to the top of the displayed musical score.

By following these processes, a piece of a musical score displayed on the color monitor 13 is renewed one after another, keeping pace with time progression, namely, progression of a music piece. In addition, if the color flag CR is set to "1", on the color monitor 13, notes are color-displayed with a different color assigned to each note name. The colored notes help unskilled players such as children and beginners perceive each note.

Figure 7:
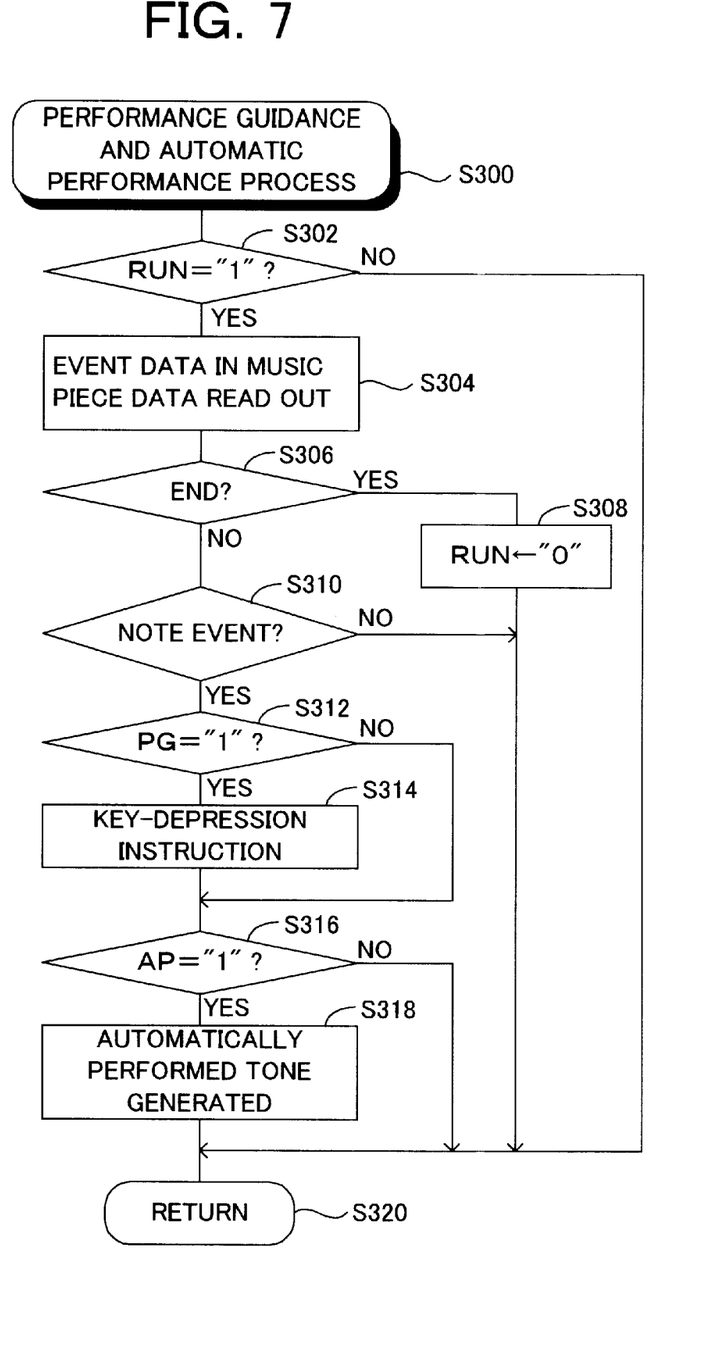
FIG. 7 is a detailed flow chart of the performance guidance and automatic performance process routine shown in FIG. 4.

Next, the performance guidance and automatic performance process routine at step S18 in FIG. 4 will be explained. This performance guidance and automatic performance process routine is provided for reading performance data in music data in accordance with time progression, giving key-depression instructions in correspondence with note number NN in the performance data, and generating tone signals in correspondence with note number NN (note event data). The performance guidance and automatic performance process routine, which is described in detail in FIG. 7, is initiated in step S300 and proceeds to step S302, where it is determined whether the running state flag RUN is at "1". If the running state flag RUN is at "0" with the automatic performance at standstill, "NO" is given to step S302, and the routine proceeds to step S320, where the performance guidance and automatic performance process routine ends.

If the running state flag RUN is at "1", "YES" is given to step 302, and the routine proceeds to step S304, where a process of reading performance event data is done. Upon this process of reading performance event data, performance event data (note event data) and end data are read out in sequence from RAM 24 at every period when a time defined by the relative time data (duration data) in the performance data has passed, while the timer 22 is used for counting time with consideration of performance tempo included in tempo data.

In step S306, it is determined whether the end data has been read out in the step S304, that is to say, whether the data read out in step S304 is the end of the music piece. If the end data has been read out, "YES" is given to step S306, and the routine proceeds to step S308, where the running state flag RUN is changed to "0". Then the routine moves on to step S320, where the routine exits, that is, the routine to read out music piece data is completed.

If it is determined that the data read out in step S304 is not the end data, "NO" is given to step S306. Then, the routine goes on to step S310 and determines whether the read data is note event data. If not, then "NO" is given to step S310, and the routine proceeds to step 320, where the performance guidance and automatic performance process routine exits. If the read data is event data, on the other hand, "YES" is given to step S310, and the routine proceeds to step S312.

In step S312, it is determined whether the guidance flag PG is at "1". If so, then "YES" is given to step S312, and the routine proceeds to step S314. Instep S314, the routine executes a key-depression instruction process, and moves on to step S316. If the guidance flag PG is at "0", on the other hand, "NO" is given to step S312, and the routine proceeds to step S316, skipping step S314.

Upon the key-depression instruction process in step S314, it is first determined whether the note number NN which is included in the note event data read out at the step S304 belongs to the right hand part (melody part) or the left hand part (accompaniment part). This determination may be made by examining whether the note number NN belongs to high range or low range. Alternatively, when a distinction between melody part and accompaniment part is made on the music piece data, this determination may be made by utilizing the distinction.

If the right hand guidance flag RH is at "1" with the left hand guidance flag LH at "0", note numbers NN belonging to the right hand part are extracted from among all of the note numbers NN read out. If the right hand guidance flag RH is at "0" with the left hand guidance flag LH at "1", note numbers NN belonging to the left hand part are extracted from among all of the note numbers NN read out. If the right hand guidance flag RH and the left hand guidance flag LH are both at "1", all of the note numbers NN are extracted. If the right hand guidance flag RH and the left hand guidance flag LH are both at "0", no extraction is made, and the routine proceeds to step S316.

The second process done in step S314 is to determine light color of key-depression indicators 12. This determination is made on the basis of the extracted note numbers NN. Upon this determination, as the color table (TABLE 1) is referred for color-coding on notes which are displayed on the color monitor 13, the routine assigns a color to a key-depression indicator 12 by calculating a remainder given after a note number NN is divided by a positive integer k and finding a color which corresponds to the remainder in the color table. Upon the color assignment to key-depression indicators 12, as well as that to notes, a tone with an accidental such as C#, D#. . . A# (a tone other than 7 natural tones of C, D . . . B in major or minor) will take the same color which is assigned to a tone one semitone lower. Accordingly, the color assignment made for key-depression indicators 12 corresponds with that for musical score display.

Figure 2:
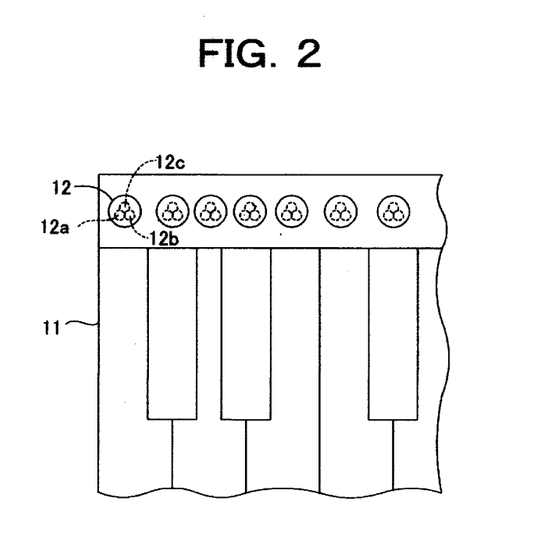
FIG. 2 is an enlarged view of the keyboard and key-depression indicators shown in FIG. 1.

The routine pairs the extracted note number NN and color controlling data representative of a color assigned to the note number NN, and outputs the paired data to the light controlling circuit 32. The light controlling circuit 32 is provided for illuminating a key-depression indicator 12 disposed above a key which corresponds to a note name represented by a note number NN, with color-coding in accordance with the color controlling data. To control light color for a key-depression indicator 12, the light controlling circuit 32 controls luminance (or brightness) of each of three light-emitting elements 12a, 12b, 12c embedded in a key-depression indicator 12 on the basis of color controlling data.

As a result, if a key-depression indicator 12 belongs to a part for which the right hand guidance flag RH or the left hand guidance flag LH requires guidance, and corresponds to a key which performance data (a note number NN) requires to be performed, the key-depression indicator 12 is lighted in a color assigned according to the note name, keeping time with the progression of a music piece. Since the color allocation employed by the key-depression indicators 12 is also employed by the color-coding of notes shown in the musical score display, a color assigned to a note name to be used for the key-depression indicator 12 is always the same color assigned to the note name to be used for musical score display. Therefore, players can easily identify a note in a musical score with a corresponding key by color, which results in enhanced effectiveness of practicing. By program processing (not shown), the lighted key-depression indicator 12 is put out when other key-depression indicator 12 for a key to be performed next is lighted on, or when the player depresses the key for which the key-depression indicator 12 is lighted.

In step S316, the routine determines whether the automatic performance flag AP is "1". If the automatic performance flag AP is at "1", "YES" is given to step S316, and the routine proceeds to step S318, where the routine executes the tone generation process for automatically performed tones. Then the performance guidance and automatic performance process routine exits in step S320. If the automatic performance flag AP is at "0", "NO" is given to step S316, and the routine proceeds to step S320 to exit.

In step S318, where a process for generating automatically performed tones is executed, note event data (note number NN, gate time and velocity) is outputted to the tone source circuit 35. Such note event data to be outputted to the tone source circuit 35 is limited to those which were included in the performance event data (note event data) read from RAM 24 in the step S304, but were not extracted in the step S314. The tone source circuit 35 forms musical tone signals according to these outputted note number NN, gate time and velocity, and generates tones via the sound system 36.

Specifically, if the right hand guidance flag RH is at "1" with the left hand guidance flag LH at "0", musical tones belonging to the left hand part are to be generated. If the right hand guidance flag RH is at "0" with the left hand guidance flag LH at "1", musical tones belonging to the right hand part are to be generated. If the right hand guidance flag RH and the left hand guidance flag LH are both at "1", no musical tone is to be generated. If the right hand guidance flag RH and the left hand guidance flag LH are both at "0", musical tones belonging to both the right hand part and the left hand part are to be generated.

Data on key-depression/release to be operated by the keyboard 11 is supplied to the tone source circuit 35 by program processing (not shown). Then, the tone source circuit 35 forms musical tone signals according to the supplied key-depression/release data, transmits the musical tone signals to the sound system 36, and generates musical tones according to the musical tone signals from the sound system 36. Thus, players are able to practice a certain part/parts with the help of performance guidance, with a part for which performance guidance is not required being automatically performed. Players can also enjoy concerted music with a plurality of parts.

In the above-described embodiment, a color table which defines correlation between note names and colors for musical score display and key-depression indication is fixed. However, the table maybe left user-customizable. To customize the table, at step S104 in FIG. 5 where the user selects various mode settings for musical score display, the user may change data representing colors corresponding to remainders in the color table. By this customization, each note name is assigned to a certain color for both note color for musical score display and light color for key-depression indication at the same time, using user-desired colors. Such customization allows users to use user-desired colors, providing users with partial colorblindness who have difficulty in perceiving certain colors with convenience in assigning colors which they can easily distinguish.

Furthermore, the customization may be done in such a manner that the user assigns a specific color for note color and key-depression indication to a specific note name such as "A4" or to a plurality of specific note names. By this customization, the assigned color will serve as a fiducial mark during the performance of a piece of music, and help the user identify the specific note name.

In the above-described embodiment, each of key-depression indicators 12, each of which consists of three light-emitting elements 12a, 12b, 12c, is capable of emitting various colors. However, the above-described embodiment may be accomplished by using those key-depression indicators 12 each of which has only one single-colored light-emitting element. In this case, several colors of single-colored light-emitting elements are used to support plural note names. These key-depression indicators 12 are arranged above the keys in the order in which correspondences between colors of light-emitting elements and note names are established. In addition, the correspondences between colors of light-emitting elements and note names are also applied to those between remainders (note names) and colors in the color table, so that colors assigned to light-emitting elements correspond with those assigned to notes in a displayed musical score. As a result, the modified embodiment can also produce the same effectiveness as the above-described embodiment: the modified embodiment also helps users identify notes in a musical score with keys to depress.

In the musical score display and key-depression indication of the above-described embodiment, each of 7 different colors is assigned to each of 7 tones (C, D, ..., B) of natural tones among 12 tones of equal tempered scale, while a tone with accidental (C#, D#, ..., A#)is assigned to the same color that is assigned to a natural tone one semitone lower than the tone with accidental. However, each of 12 tones of equal tempered scale (C, C#, D, ..., B) may be assigned to each of 12 different colors. Furthermore, to assign a different color to each tone in different octaves, each octave may be assigned a different set of colors.

In the musical score display of the above-described embodiment, tones with accidental such as C#, D#, ..., A# are regarded as natural tones (C, D, ..., A) which are one semitone lower than the original tones, and an accidental of "#" is added to the natural tones in a musical score. However, this may be modified in the following manner by taking data on musical key into consideration; a tone with accidental which is one semitone higher than its natural tone may be added "#", while a tone with accidental which is one semitone lower than its natural tone may be added "b".

In key-depression indication of the above-described embodiment, key-depression indicators 12 to be depressed are lighted in synchronous timing with the progression of a music piece. However, key-depression indicators 12 to be depressed maybe lighted earlier by a predetermined time than the progression of a music piece. Alternatively, key-depression indicators 12 to be depressed may be lighted in such a manner that a key-depression indicators 12 which are one note ahead of currently performed note are lighted.

In the above-described embodiment, the case in which the musical score displaying apparatus and the performance assisting apparatus are applied to an electronic musical instrument which has a keyboard as performance operators has been described. However, the present invention may be applied to various instruments which have touch-plates, push buttons, strings, etc. as performance operators. The musical score displaying apparatus to be applied to the present invention may be replaced by various computer apparatuses such as personal computer as far as those apparatuses are computer-controllable and has a display capable of color-displaying a musical score. The performance assisting apparatus to be applied to the present invention does not necessarily require the tone source circuit for generating musical tone signals, and may be replaced by such apparatus as connects a performance operating device (e.g. keyboard) to a personal computer or the like.

In the above-described embodiment, data formatted as shown in FIG. 8 is used as music piece data. However, various formats may be used for the embodiment of the present invention; for example, a data format in which event data on key-on and key-off and time data representing time taken between each event are stored without gate time data.

Additionally, as embodiments of the present invention are not limited to the above-described embodiment and modifications, various changes and modification may be made in the invention without departing or scope of the invention.

What is claimed is:

1. A musical score displaying apparatus for displaying a musical score corresponding to music piece data constituted of a series of note data each of which represents a note and includes at least a note number representative of a note name, said musical score displaying apparatus comprising:

a color monitor capable of displaying at least a musical score; and a musical score display controller for controlling said color monitor on the basis of said music piece data to display on said color monitor a musical score corresponding to said music piece data, wherein a plurality of notes are displayed on said color monitor in a different color assigned to each note name based on note numbers included in said series of note data.

2. A musical score displaying apparatus according to claim 1, wherein said color assignment to the plurality of notes in the music score is fixed.

3. A musical score displaying apparatus according to claim 1, wherein said color assignment to the plurality of notes in the music score is customizable.

4. A performance assisting apparatus for assisting performance by using music piece data constituted of a series of note data each of which represents a note and includes at least a note number representative of a note name, said performance assisting apparatus comprising:

a plurality of performance operators, provided in corresponding relation to a plurality of note names, for triggering generation of a plurality of musical tones corresponding to said plurality of note names respectively by performance operation;

a plurality of performance indicators, provided in corresponding relation to said plurality of performance operators, for indicating a performance operator to be performed by lighting in a different color assigned to each note name;

a performance indication controller for controlling said plurality of performance indicators on the basis of said music piece data, so that said plurality of indicators indicate a performance operator to be operated by lighting in a different color assigned to each note name;

a color monitor capable of displaying at least a musical score; and a musical score display controller for controlling said color monitor on the basis of said music piece data to display on said color monitor a musical score corresponding to said music piece data, wherein a plurality of notes are displayed on said color monitor in a different color assigned to each note name based on note numbers included in said series of note data by adopting the same color assignment that is used by said plurality of performance indicators.

5. A performance assisting apparatus according to claim 4, wherein said color assignment both to the plurality of notes in the music score and to the plurality of performance indicators is fixed.

6. A performance assisting apparatus according to claim 4, wherein said color assignment both to the plurality of notes in the music score and to the plurality of performance indicators is customizable.

7. A performance assisting apparatus according to claim 4, wherein said plurality of performance indicators have various colors of monochromatic light-emitting devices, wherein a different color is assigned to each note name.

8. A performance assisting apparatus according to claim 4, wherein each of said plurality of performance indicators is comprised of a combination of a plurality of light-emitting elements each of which has a different color; and said performance indication controller assigns a different color to each note name by controlling luminance of the plurality of light-emitting elements of each performance indicator based on note numbers included in said series of note data.

9. A musical score displaying method for displaying on a color monitor a musical score corresponding to music piece data constituted of a series of note data each of which represents a note and includes at least a note number representative of a note name, said musical score displaying method comprising the step of:

controlling said color monitor on the basis of said music piece data to display on said color monitor a musical score corresponding to said music piece data, wherein a plurality of notes are displayed on said color monitor in a different color assigned to each note name based on note numbers included in said series of note data.

10. A performance assisting method which is applied to a performance apparatus having a plurality of performance operators, provided in corresponding relation to a plurality of note names, for triggering generation of a plurality of musical tones corresponding to said plurality of note names respectively by performance operation, a plurality of performance indicators, provided in corresponding relation to said plurality of performance operators, for indicating a performance operator to be performed by lighting in a different color assigned to each note name, and a color monitor capable of displaying at least a musical score, and which assists performance by using music piece data constituted of a series of note data each of which represents a note and includes at least a note number representative of a note name, said performance assisting method comprising the steps of:

controlling said plurality of performance indicators on the basis of said music piece data, so that said plurality of performance indicators indicate a performance operator to be operated by lighting in a different color assigned to each note name; and     controlling said color monitor on the basis of said music piece data to display on said color monitor a musical score corresponding to said music piece data, wherein a plurality of notes are displayed on said color monitor in a different color assigned to each note name based on note numbers included in said series of note data by adopting the same color assignment that is used by said plurality of performance indicators.

11. A musical score displaying program which enables a computer to display on a color monitor a musical score corresponding to music piece data constituted of a series of note data each of which represents a note and includes at least a note number representative of a note name, said musical score displaying program comprising the step of:

controlling said color monitor on the basis of said music piece data to display on said color monitor a musical score corresponding to said music piece data, wherein a plurality of notes are displayed on said color monitor in a different color assigned to each note name on the basis of note numbers included in said series of note data.

12. A performance assisting program which enables a computer to be applied to a performance apparatus having a plurality of performance operators, provided in corresponding relation to a plurality of note names, for triggering generation of a plurality of musical tones corresponding to said plurality of note names respectively by performance operation, a plurality of performance indicators, provided in corresponding relation to said plurality of performance operators, for indicating a performance operator to be performed by lighting in a different color assigned to each note name, and a color monitor capable of displaying at least a musical score, and to assist performance by using music piece data constituted of a series of note data each of which represents a note and includes at least a note number representative of a note name, said performance assisting program comprising the step of:

controlling said plurality of performance indicators on the basis of said music piece data, so that said plurality of performance indicators indicate a performance operator to be operated by lighting in a different color assigned to each note name; and     controlling said color monitor on the basis of said music piece data to display on said color monitor a musical score corresponding to said music piece data, wherein a plurality of notes are displayed on said color monitor in a different color assigned to each note name based on note numbers included in said series of note data by adopting the same color assignment that is used by said plurality of performance indicators.

\* \* \* \* \*